United States Patent [19]

Petrecca

[11] Patent Number: 4,474,311

[45] Date of Patent: Oct. 2, 1984

[54] THERMOPLASTIC MELTING AND DISPENSING APPARATUS

[75] Inventor: Peter J. Petrecca, Atlanta, Ga.

[73] Assignee: Nordson Corporation, Amherst, Ohio

[21] Appl. No.: 287,490

[22] Filed: Jul. 31, 1981

[51] Int. Cl.³ .............................................. B67D 5/62
[52] U.S. Cl. ............................ 222/146.5; 126/343.5 R
[58] Field of Search ........ 222/146 HE, 146 H, 146 R, 222/377; 126/343.5 R, 343.5 TA, 144; 110/349, 267

[56] References Cited

U.S. PATENT DOCUMENTS

| 3,531,023 | 9/1970 | Mercer | 222/146 HE |
| 3,964,645 | 6/1976 | Scholl | 222/377 |
| 4,178,876 | 12/1979 | Nicklas | 222/146 HE |
| 4,352,442 | 10/1982 | Leibhard et al. | 222/146 HE |

FOREIGN PATENT DOCUMENTS

| 780651 | 8/1957 | United Kingdom . |
| 1,144,779 | 3/1969 | United Kingdom . |
| 1,175,650 | 12/1969 | United Kingdom . |
| 1,222,258 | 2/1971 | United Kingdom . |
| 1,279,581 | 6/1972 | United Kingdom . |
| 1,402,170 | 8/1975 | United Kingdom . |

OTHER PUBLICATIONS

Optimatic Brochure.

Primary Examiner—Joseph J. Rolla
Assistant Examiner—Kenneth Noland
Attorney, Agent, or Firm—Wood, Herron & Evans

[57] ABSTRACT

An apparatus for melting and dispensing thermoplastic material comprising a hopper, a grid melter, a reservoir and a pump. Solid thermoplastic material contained within the hopper is melted by the grid melter and flowed into a reservoir from which the pump supplies the molten material to a dispenser. The inside walls of the hopper are coated with "Teflon" which has been found to expedite remelting of molten material which has backed up into the hopper and solidified there. Additionally, the "Teflon" coating has been found to solve the problem of the seals between the reservoir, grid melter and hopper springing leaks upon the remelting of solid thermoplastic material contained in the hopper.

10 Claims, 3 Drawing Figures

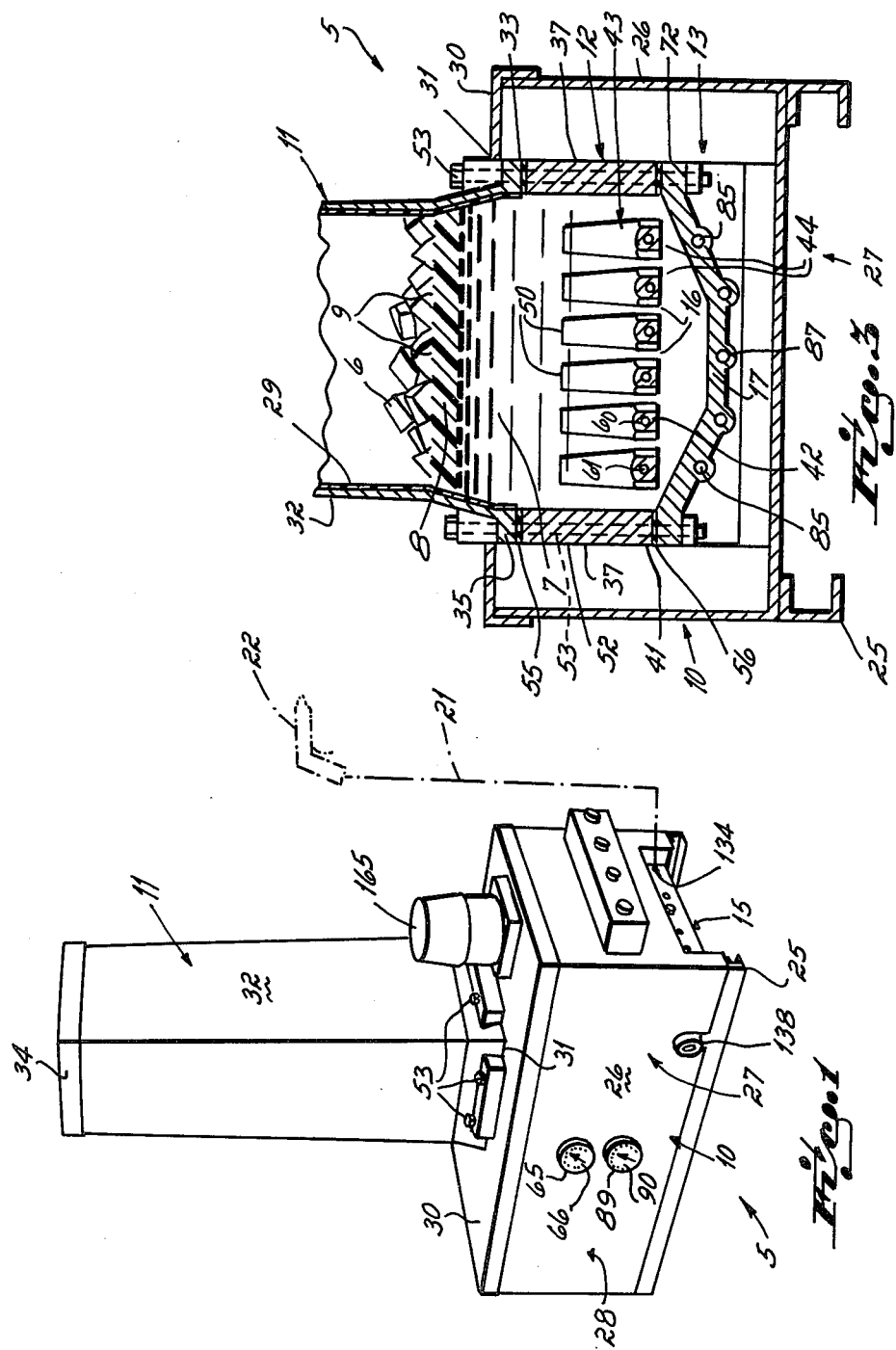

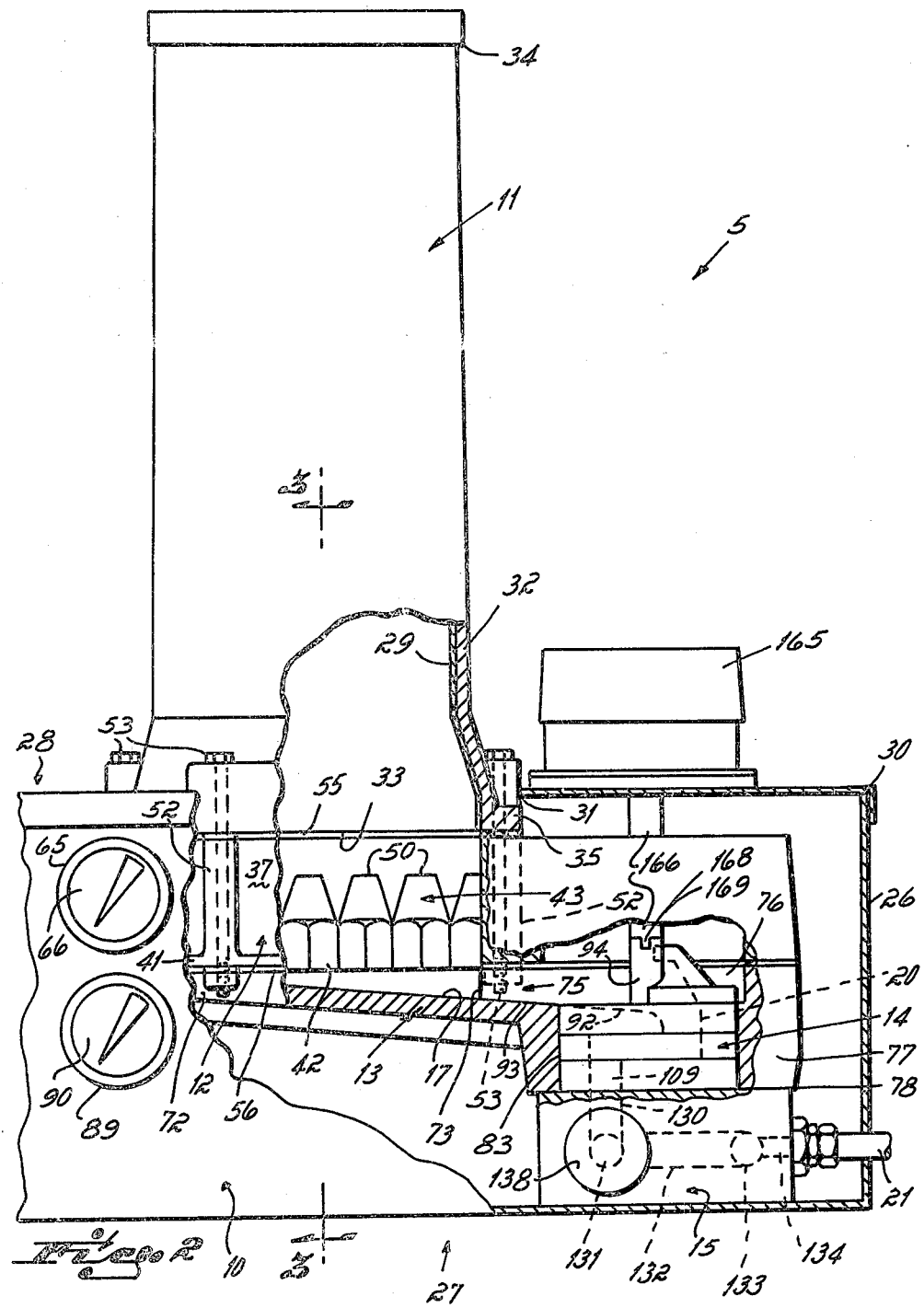

THERMOPLASTIC MELTING AND DISPENSING APPARATUS

This invention relates to apparatus for melting and dispensing thermoplastic material.

Historically, thermoplastic adhesives or so-called "hot melt" adhesives were converted from a solid to a molten state in a tank having heated walls. The melted material was maintained in the molten state in the tank in sufficient volume to supply one or more applicators or dispensers. If the job or application required a substantial volume of hot melt adhesive, a sufficiently large volume of material was required to be maintained in the molten or melted state to meet that need. That substantial volume usually necessitated a long warm-up or start-up time for the apparatus as well as prolonged exposure of at least some of the molten material to heat and/or to oxygen.

A characteristic of most thermoplastic materials is that they oxidize, char, or degrade when exposed to heat in the molten state for a prolonged length of time and/or when exposed to oxygen in the molten state for any appreciable length of time. Consequently, it has always been desirable to minimize the time that an applicator system maintains the melted material in the molten state. This minimal duration molten state of the adhesive material is accomplished by balancing or matching the melt rate of the system with the application rate.

In U.S. Pat. No. 3,964,645 there is disclosed an apparatus for melting and dispensing a large volume or so-called high throughput of thermoplastic materials. That apparatus includes a grid melter having a very high melt rate for melting the solid thermoplastic material and supplying it in the molten state to a relatively small holding reservoir from which the molten material is pumped to a dispenser.

The high melt rate and the efficiency of the melter of the above identified application has created unforseen problems when that apparatus is used to dispense molten material at a lesser rate than that for which it is designed. In that event, the melter is operative to melt greater quantities of the thermoplastic material than is used, with the result that the molten material fills the molten material reservoir, the melter, and eventually backs up or "melts back" into the hopper. When the apparatus is then turned off or shut down with molten material contained in the hopper, that molten material solidifies and is then difficult or requires a long time to remelt with the result that the solid portion of the remelt may form a "bridge" across the walls of the hopper and thereby block infeed of solid stock from the hopper into the melter.

In addition to the problem of slow remelt caused by molten material backing up into the hopper and then, upon remelt, forming a solid "bridge" across the hopper, this bridge also acts as a pressure cap adhered to the side walls of the hopper. In the case of some adhesives, as for example pressure sensitive adhesives which have a high rate of thermal expansion, that pressure cap often results in a sufficiently high pressure buildup in the molten material to cause the apparatus to spring a leak at the sealed joints between the hopper and the melting grid or between the melting grid and the reservoir.

It has therefore been a primary objective of this invention to speed up remelt of solid thermoplastic material in the hopper.

Another objective of this invention has been to provide an improved apparatus for melting and dispensing thermoplastic material which is not subject to leakage through the joints or seals between the hopper, grid and reservoir upon remelt of the molten adhesive.

These objectives are accomplished and this invention is predicated upon the concept of coating the inside surface of the hopper walls with a coating of high temperature fluorinated ethylene-propylene ("Teflon"). The presence of this coating on the walls of the hopper has the effect of preventing the solid thermoplastic bridge from adhering or sticking to the walls of the hopper so that upon remelt, the "bridge" or cap or solid thermoplastic material slides down in the hopper into contact with the grid melter and is thereby quickly remelted. Further, upon remelt, the solid bridge or cap does not adhere to the walls of the hopper and is therefore free to rise in the hopper so as to accommodate unlimited thermal expansion of the molten thermoplastic material without any resulting pressure build-up, thereby eliminating any leaks of that molten material which would otherwise be caused by the pressure build-up.

In addition to expediting the remelt of thermoplastic material in the hopper and eliminating the problem of leaks caused by the remelt solid bridge or cap over the molten adhesive, the "Teflon" coating on the inside walls of the hopper also facilitates clean-up of the hopper. Heretofore, whenever thermoplastic material or thermoplastic material char was cleaned from the walls of the hopper, the hopper was required to be removed from the grid and reservoir and soaked in a solvent. The practice of this invention eliminates the need to remove the hopper and soak it in a solvent in order to clean it. All that is now required is to warm the hopper walls slightly above room temperature and to scrape or peel the solid material and/or char from the walls.

These and other objects and advantages of this invention will be more readily apparent from the following description of the drawings in which:

FIG. 1 is a perspective view of one embodiment of a thermoplastic material melting and dispensing apparatus incorporating the invention of this application.

FIG. 2 is a side elevational view, partially broken away, of a portion of the apparatus of FIG. 1.

FIG. 3 is a cross sectional view taken on line 3—3 of FIG. 2.

Referring first to the figures, it will be seen that the thermoplastic material melting and dispensing apparatus 5 of this invention comprises a housing 10 within which there is located a hopper 11, a grid melter 12, a reservoir 13, a gear pump 14, and a manifold block 15. Solid thermoplastic material 6 in the form of chunks (FIG. 3), or blocks are placed in the top of the hopper 11 from which they flow through the open bottom into contact with the top surface of the grid melter 12. The grid melter 12 is heated so that surface contact of the solid thermoplastic material with the top surface of the grid causes the solid thermoplastic material to be melted and converted to a molten state. The molten thermoplastic material 7 then flows downwardly through bottom passageways 16 in the grid melter into the reservoir 13 located immediately beneath the melter 12. The reservoir has sloping bottom walls 17 which direct the molten material toward the inlet 20 of the pump 14. The pump then moves the molten material into the manifold block 15 from whence it is directed to one or more conventional applicators or dispensers 22 via hoses or conduits 21.

The housing 10 comprises a base 25 and a shell or cover 26 mounted atop the base plate. The cover 26 encloses two sections of the applicator, the melt section 27 and the control section 28. The two sections are separated by an insulative barrier (not shown). Within the control section 28 are all of the electrical components for controlling the temperature of the components throughout the system. These controls form no part of the invention of this application and are conventional in commercially available equipment, as for example equipment of the type shown in U.S. Pat. No. 3,792,901, issued Feb. 19, 1974 and assigned to the assignee of this application.

The top 30 of the cover has an opening 31 into which there is fitted the hopper 11. The hopper comprises a vertical tube shaped aluminum casting 32, the bottom 33 of which is open and the top of which is closed by a lid 34. Around the periphery of the bottom of the hopper there is a flange 35 which is bolted to the top of the grid melter 12. As explained more fully hereinafter, the invention of this application resides in the provision of a high temperature "Teflon" coating 29 over the complete interior surface of aluminum casting 32.

Grid Melter

Referring to FIGS. 2 and 3 it will be seen that the grid melter 12 comprises a receptacle into which solid thermoplastic material flows from the hopper 11. This receptacle comprises four side walls 37 and a bottom flange 41. The bottom itself comprises a plurality of vertical protrusions or heater elements 43, each one of which is hexagonal in cross section at the base 42 and has an upper end shaped as a truncated cone. The protrusions are arranged in longitudinal rows 44 with the base 42 of each protrusion 43 interconnected and integral with the adjacent protrusions 43 of the same row 44. The protrusions 43 of adjacent rows 44 are longitudinally offset from each of the protrusions of the adjacent rows such that when viewed in top plan the protrusions create a staggered pattern or rows and columns, but with the protrusions of the columns spaced apart and separated by an intermediate row of protrusions. There are open passageways 16 located on opposite sides of each row and extending for the length of the row. These passageways 16 open into the top of the reservoir 13.

In the melting of thermoplastic materials it is critical that the melter have a large surface area in contact with the poor heat conductive blocks or pellets of thermoplastic material. To this end, the grid melter 12 has truncated cone shaped heater elements on its top surface for engagement with the thermoplastic blocks.

The truncation or blunting of the topmost surface 50 of the "cone" increases the area in contact with the solid thermoplastic material.

In one preferred embodiment the grid melter 12 is formed as an integral casting. This casting has external lugs 52 formed on each end and side wall 37. Each lug is vertically bored to accommodate bolts 53 for mounting the hopper on top of the grid melter 12 and the grid melter upon the top of the reservoir 13. Between the bottom of the hopper and the top of the grid there is a gasket 55 and between the bottom of the grid and the top of the reservoir there is a gasket 56. These gaskets form liquid and gas tight seals between the hopper, grid and reservoir.

There are horizontal bores 60 which extend through the base portions 42 of each row of heater element protrusions 43. An electrical resistance heater 61 is mounted within each of these bores 60 so that one heater extends into and through the bases of each row of frustoconical heater elements. There is also a bore (not shown) which extends into the melter within which a temperature sensor device (not shown) is mounted. This device is used to control and maintain the temperature of the heater elements 61 at a preset temperature. There is also a bore (not shown) formed in the grid melter block which accommodates a conventional temperature measuring gauge 65, the front face 66 of which is located upon the control panel of the housing 26.

Reservoir

The reservoir 13 comprises an open top, closed bottom receptacle which is fixedly secured to the bottom of the grid melter. The reservoir has shallow side and rear walls 72. The front wall 73 is slightly deeper such that the bottom of the reservoir slopes downwardly from the rear and side walls toward a front opening 75 in the front wall 73. This opening 75 functions as the entrance for molten material into a blind recess 76 formed in a pump mounting boss 77 of the reservoir. The blind recess 76 of the pump mounting boss 77 is intersected by a vertical bore 83 which extends from the bottom of the boss 77 into the recess 76. The pump 14 is located within this bore 83 and bolted to the manifold block 15.

The boss 77 has a base portion 78, the bottom flat surface of which rests atop and is supported by the manifold block 15. The manifold block in turn rests upon and is supported from the base 25 of the housing. The manifold block 15 and pump mounting boss 77 of the reservoir are secured together by bolts (not shown) which extend through and are threaded into aligned vertical bores.

In the preferred embodiment there are two identical U-shaped resistance heaters 85 molded within the bottom walls 17 of the reservoir. There is also a tube 87 molded within the bottom wall. A temperature sensor is inserted into the tube 87 and is utilized to control the flow of electrical current to the heaters 85 so as to maintain the bottom at a preset temperature. There is also a transverse bore (not shown) located beneath the side wall of the reservoir. This bore accommodates a conventional temperature measuring gauge 89, the front face 90 of which is located on the control panel of the housing 26.

Pump

The pump 14 has a top surface 92 which is co-planar with and forms a continuation of the sloping surface 93 of the reservoir bottom wall 17. In the preferred embodiment it slopes at an angle of approximately 5° to the horizontal plane. The slope is such that the natural flow of molten material over the bottom wall of the reservoir is toward the pump inlet 20.

The pump 14 is a gear pump and is the subject of the above identified U.S. Pat. No. 3,964,645. Accordingly, it has not been described in detail herein.

The pump 14 is secured to the top of the manifold block by bolts (not shown) which extend vertically through vertical bores in the pump and are threaded into the manifold block.

Manifold Block

The manifold block 15 is ported such that the molten material flowing from the outlet port 109 of the pump flows into the vertical inlet port 130 of the manifold. The inlet port communicates with a longitudinal passage 131, a transverse passage 132, a longitudinal passage 133 on the front side of the block and outlet ports 134. Conventional dispensers, as for example conventional hot melt applicator guns or dispensers 22 of the type shown in U.S. Pat. No. Re. 27,865 or U.S. Pat. No. 3,690,518 may be attached to the outlet ports 134 of the manifold block, either directly or by conventional heated hoses. The number of outlet ports and connected dispensers will vary depending upon the particular application to which the system is applied.

Intersecting the longitudinal passageway 131 and extending coaxially with it there is a filter mounting bore. This bore accommodates a conventional filter, one end of which comprises a plug 138 threaded into a threaded end section 139 of the bore. A complete description of the filter assembly may be found in U.S. Pat. No. 3,224,590 which issued Dec. 21, 1965.

Pump Drive System

The pump 14 may be driven in rotation by any conventional type of drive motor 165 and interconnected drive shaft 166. In the preferred embodiment illustrated in FIGS. 1–3, the motor drive shaft has a key 168 on its outer end which fits within a key-way slot 169 at the upper end of the pump drive shaft 94. The motor 165 is mounted atop the cover 30 of the housing, and is a rotary pneumatic motor driven by conventional shop air pressure and operative to effect rotation of the shaft 166 at a predetermined speed through a conventional gear reduction unit mounted interiorly of the motor housing.

Hopper Melt Back

The thermoplastic material melting and dispensing apparatus heretofore described except for the hopper 11 and its attachment to the grid 12 is completely disclosed in U.S. Pat. No. 3,964,645 assigned to the assignee of this application. The invention of this application resides in the provision of means to prevent molten thermoplastic material from leaking through the seals or gaskets 55, 56 between the hopper, the grid melter and the reservoir upon remelt of solid thermoplastic material contained within the hopper. Additionally, this invention resides in the provision of means for expediting the remelt of solid thermoplastic material 8 contained within the hopper. With reference to FIG. 3 it will be seen that molten material melted by the grid melter 12 backs up into the hopper 11 whenever the feed stock 6 is melted by the grid melter 12 at a faster rate than it is dispensed through the dispenser 22. This condition frequently occurs with the result that the molten material backs up a substantial distance into the hopper as indicated at the interface 9 between feed stock 6 and solid material 8 in FIG. 3. In the event that the dispenser is then shut down and the complete apparatus is turned off and allowed to cool after the molten material has backed up to the interface 9 in the hopper, that molten material will all solidify in the hopper. In the case of many hot melt adhesives, the molten material adheres to the inside walls of the hopper 11 upon solidification. Upon restarting of the apparatus that solidified material contained in the hopper must be remelted. However, because most thermoplastic material has poor heat conductive qualities, it very often takes a long time to restart the apparatus and remelt all of the formerly molten but now solidified material 8 contained within the hopper. While that remelt is occurring, molten material 7 will be entrapped beneath a solid "bridge" or cap 8 of formerly molten but now solid thermoplastic material adhered to the inside walls of the hopper. That solid "bridge" or cap serves to entrap any pressure build-up which occurs upon thermal expansion of the remelted material 8 entrapped beneath the plug. Many thermoplastic materials, and particularly pressure sensitive thermoplastic adhesives have a high coefficient of expansion with the result that when these materials are remelted in the hopper, there is a substantial pressure build-up beneath the solid plug in the hopper. Prior to this invention, that plug and the resulting pressure build-up sufficient to allow molten material to squeeze through the gaskets 55, 56 with the result that the apparatus sprang a leak or blew out the sealing gaskets 55 and 56.

To avoid these pressure build-up caused leaks and to expedite the remelt of solid material 8 contained in the hopper, the inside surfaces of the walls of the hopper 11 are coated with a high temperature "Teflon" coating. In the preferred embodiment this "Teflon" coating 29 is applied after fire cleaning the inside walls of the hopper at a temperature of 700° F. Those inside walls are then sand blasted with a super fine #80 grit virgin silica. A primer coat of high temperature "Teflon" and in the preferred embodiment a fluorinated ehtylene-propylene resin (FEP) "Teflon" manufactured by DuPont and designated by formulation No. 851-204 is then applied to the interior surface of the hopper and baked at 700° F. for 20 minutes. Thereafter, a first coat of FEP "Teflon" manufactured by DuPont and designated as formulation No. 856-204 is applied over the primer coat and baked at 700° F. for 20 minutes. A second coat of DuPont FEP "Teflon" No. 856-204 is then applied over the first coat and baked at 700° F. for 30 minutes. The resulting 3-ply "Teflon" coating has been found to be very durable and to possess the requisite non-stick properties to prevent molten thermoplastic material which has backed up into the hopper from adhering thereto when allowed to cool and solidify within the hopper. By avoiding adhesion of the solid plug 8 to the inside walls of the hopper, the plug is free to move up in the hopper upon expansion of molten thermoplastic material beneath the plug or to fall by gravity downwardly in the hopper into contact with the grid melter upon remelting of the plug.

In addition to the expedited remelting of solid thermoplastic material effected by the "Teflon" coating and the avoidance of pressure build-up caused leakage through the seals or gaskets 55, 56 effected by the coating 29, the coating also renders the hopper easier to clean. Prior to this invention it has been the practice to clean the hopper by removing it from the grid 12 and soaking it in a solvent so as to remove solidified adhesive and char attached to the inside surface of the hopper. With the application of the "Teflon" coating, solvent is no longer needed to clean the inside walls of the hopper 11. These side walls need only to be warmed slightly above room temperature so as to enable adhesive and char to be peeled or scraped from the inside walls of the hopper.

While I have disclosed only a single preferred embodiment of my invention, persons skilled in the art to which this invention pertains will readily appreciate numerous changes and modifications which may be made without departing from the spirit of my invention.

Therefore, I do not intend to be limited except by the scope of the following appended claims:

I claim:

1. An apparatus for converting solid thermoplastic material to molten thermoplastic material and for dispensing the molten thermoplastic material, comprising
   a housing including a hopper having side walls for receiving solid thermoplastic material,
   a flow through grid melter secured to the lower portion of said hopper,
   at least one opening through said grid melter,
   a reservoir mounted beneath said grid melter and adapted to receive molten material from said discharge opening of said grid melter,
   at least one seal between said hopper, grid melter and reservoir,
   means for heating said grid melter,
   a pump adapted to supply said molten thermoplastic material from said reservoir to a dispenser, and
   leak prevention means for preventing molten thermoplastic material from solidifying and forming a solid bridge adhered to the inside surfaces of said side walls of said hopper so that upon subsequent remelt of said solid thermoplastic material, said solid bridge forms a gas barrier adhered to said inside surfaces of said hopper with a resultant pressure build-up beneath said solid bridge and failure of said seal so that molten thermoplastic material is free to leak through said seal between said hopper, said grid melter and said reservoir, said leak prevention means comprising,
   a solid low coefficient of friction, non-stick coating over at least the portion of the inside walls of said hopper which comes into contact with thermoplastic material in the molten state.

2. The apparatus of claim 1 in which said coating is applied to said inside walls over the areas of said walls adjacent to said grid melter.

3. The apparatus of claim 1 in which said coating is applied to substantially all of the inside wall area of said hopper walls.

4. The apparatus of claim 1 in which said coating comprises a "Teflon" coating.

5. The apparatus of claim 1 in which said coating is made from fluorinated ethylene-propylene resin.

6. A method of preventing seal failure in an apparatus for converting solid thermoplastic material to molten thermoplastic material, which apparatus comprises a housing including a hopper having side walls for receiving solid thermoplastic material, a flow-through grid melter sealingly secured to the lower portion of said hopper, and a reservoir sealingly mounted beneath said grid melter and adapted to receive molten material from said grid melter, which method comprises
   applying multiple plies of a solid, low coefficient of friction, non-stick coating over at least the portion of the inside walls of said hopper which comes into contact with thermoplastic material in the molten state so as to prevent thermoplastic material which has backed up into the hopper in the molten state and solidified therein from creating a pressure build-up beneath the hopper and inducing seal failure and leakage of molten material from between the hopper and the grid melter or between the grid melter and the reservoir upon remelt of the solidified material.

7. The method of claim 6 which comprises applying multiple plies of a coating of "Teflon" to the inside walls of said hopper.

8. An apparatus for converting solid thermoplastic material to molten thermoplastic material and for dispensing the molten thermoplastic material, comprising:
   a housing including a hopper for receiving solid thermoplastic material, a reservoir for receiving molten thermoplastic material and heating means communicating with said hopper and reservoir for heating said solid thermoplastic material to a molten state;
   solid, low coefficient of friction non-stick coating disposed over at least a portion of the surfaces of said housing which contact molten thermoplastic material, said coating being formed in at least two layers of differing fluorinated ethylene-propylene resin materials, one of said layers being a high-temperature layer, said high-temperature layer being applied directly to said housing surfaces and said other layer being applied over said high-temperature layer, said coating being operable to limit adhesion of said thermoplastic material to said housing surfaces upon cooling of said thermoplastic material from a molten to solid state.

9. The apparatus of claim 8 which includes a third layer of fluorinated ethylene-propylene resin material over said second layer.

10. A method of preventing seal failure at the interface of a pressure sealed surface between a hopper and a reservoir of an apparatus for melting solid thermoplastic material, which hopper is adapted to receive solid thermoplastic adhesive material preparatory to the melting of that solid thermoplastic adhesive material and storing of the molten thermoplastic material in the reservoir, which method comprises
   applying at least one high temperature layer of a fluorinated ethylene-propylene resin material over at least a portion of said surfaces; and
   applying at least one other layer of different fluorinated ethylene-propylene material over said at least one high temperature layer.

* * * * *

UNITED STATES PATENT AND TRADEMARK OFFICE
CERTIFICATE OF CORRECTION

PATENT NO. : 4,474,311

DATED : Oct. 2, 1984

INVENTOR(S) : Peter J. Petrecca

It is certified that error appears in the above-identified patent and that said Letters Patent is hereby corrected as shown below:

Col. 6, line 15, after "build-up" insert -- was --

Signed and Sealed this

Sixteenth Day of April 1985

[SEAL]

Attest:

DONALD J. QUIGG

Attesting Officer

Acting Commissioner of Patents and Trademarks